United States Patent Office 3,058,880
Patented Oct. 16, 1962

---

3,058,880
PROCESS FOR COMBATING SNAILS
Adam Müller, Bamberg-Lichteneiche, and Gottfried Pampus, Leverkusen, Germany, assignors to Farbenfabriken Bayer Aktiengesellschaft, Leverkusen, Germany, a corporation of Germany
No Drawing. Filed Feb. 16, 1960, Ser. No. 8,929
9 Claims. (Cl. 167—33)

The present invention relates to and has as its objects new and useful snail combating agents and a process for combating slugs or snails with these compounds. Generally the compounds used according to this invention may be represented by the following formula

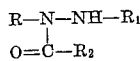

wherein R denotes a phenyl radical which may be substituted by alkyl, alkoxy, halogen or nitro groups; $R_1$ may be an alkyl- or aryl-carboxylic ester group or it may be identical with R; $R_2$ is an alkoxyl, or aroxyl group, a primary or secondary amino group; $R_1$ and $R_2$ may also be linked with one another to form a heterocyclic, especially a triazolidine ring; R may also denote hydrogen, in this case the grouping being

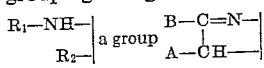

wherein A stands for an alkyl group, preferably with 1–4 carbon atoms, a phenyl radical or hydrogen, and B stands for a lower alkyl radical.

It is known that freshly prepared quicklime, charlock, kainite, calcium cyanamide, copper sulfate, calcium arsenate or metaldehyde have been used already for combating terrestrial snails (slugs as well as snails).

The quantities to be used per combating area are quite considerable and the results attained often insufficient (cf. Froemming: "Der heutige Stand der Landschnecken-bekämpfung mit chem. Mitteln," Gasunde Pflanze, No. 12, vol. 7, December 1955, pages 261–266.

There is, therefore a genuine demand for combating terrestrial snails with chemical agents which are non-toxic for warm-blooded animals and kill obnoxious snails with certainty at a low content of active substance.

Now in accordance with the invention it has been found that the compound shown in the above formula exhibit a remarkable activity against snails and slugs and therefore may be used efficiently to combat those pests.

The compounds of the above shown formulae may be prepared by reacting according to known processes, for example, phenyl hydrazine with one mol of chlorocarbonic acid ester and subsequently with a carbamyl chloride, an isocyanate or a chlorocarbonic acid ester. It is known that in similar manner symmetric diaryl hydrazines are reacted with the aforesaid acylation agents. Some of the compounds are readily obtainable by the reaction of hydrazines with the corresponding 1.3-dicarbonyl compounds.

Compounds useful according to the present invention not known already specifically may be prepared exactly as those compounds which are already known from the literature.

Typical examples for the inventively effective compounds are e.g. the 2-phenyl-4-n-butyl-semicarbazid-1-carbonic acid methyl ester of the following formula

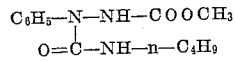

as well as the corresponding ethyl-, propyl- and butyl-ester. Furthermore the 2-phenyl-4-cyclohexyl-semicarbazid-1-carbonic acid ethyl ester of the following formula

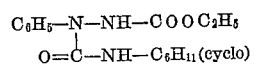

and the 1.2-diphenyl-4-n-butyl-semicarbazid of the following formula

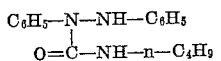

are typical examples of the inventively used compounds.
The nomenclature of these compounds is based on the known enumeration of semicarbazides, i.e.

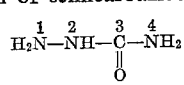

see S. Petersen in Houben Weyl, vol. 8, "Carbonic Acid Derivatives."

Further inventively used compounds are the 1.2-diphenyl-hydrazine carbonic acid phenyl ester of the following formula

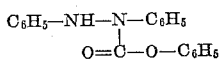

the 1-phenyl-4-n-butyl-1.2.4-triazolidine-3.5-dion of the following formula

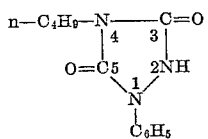

and the 1-phenyl-4-(p-dimethyl amino)-phenyl-1.2.4-triazolidine-3.5 dione of the following formula

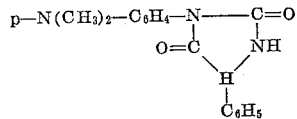

The last two mentioned compounds are such compounds in which the above named formula the symbols $R_1$ and $R_2$ are linked together to form a triazolidine ring system.

Further examples are the 3-methyl-pyrazolone-5 of the following formula

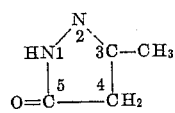

and the 3-methyl-4-phenyl-pyrazolone-5 of the following formula

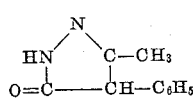

These compounds belong to the class in which the group

stands for the following group

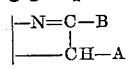

The conventional manner of combating terrestrial snails, for example, with metaldehyde, is carried out in practice by using baits in the form of mixtures of metaldehyde and bran which generally contain 3.5–5% of metaldehyde. An advantage of the compounds according to the invention consists inter alia in a substantial reduction of the active substance contained in the bran-bait mixture. It has thus been found that even 2% of active substance of the compounds according to the invention are sufficient to produce the same result as that attained with a metaldehyde/bran bait. Comparing the time required for killing (i.e. from the start to the end of the test) the 2% concentrations according to the invention are even more effective than mixtures of bran and bait containing 3.6% of metaldehyde. In addition to the biological activity the favourable toxicity values of the compounds claimed by the present invention are of special importance.

Metaldehyde thus kills, for example, all test animals within 24 hours when administered per os at a rate of 375 mg./kg. rat. On the other hand, rats outlived a dose of 2500 mg./kg. of 2-phenyl-4-n-butyl-semicarbazide-1-carbonic acid methyl ester and 1.2-diphenylhydrazine-carbonic phenyl ester when administered per os. Upon administration of 2500 mg./kg. of 3-methylpyrazolone-5-per os only two of the five rats employed in the test were killed within 7 days, whilst a dose of 2000 mg./kg. of this compound did not destroy any of the test animals.

The following examples are given for the purpose of illustrating the invention.

Example 1

For the determination of the molluscicidal action an approximately 5 centimeter-thick earth layer is placed in a glass dish having a diameter of 25 centimeters and a height of 13 centimeters. A bran-bait mixture containing 5% of active substance (for example, 2-phenyl-4-n-butyl-semicarbazide-1-carbonic acid methyl ester, 1.2-diphenylhydrazine-carbonic acid phenyl ester or 3-methyl-pyrazolone-5) is placed in the centre of the dish. The heaped bait has a diameter of about 5 centimeters.

16 snails (8 *Arion hortensis* and 8 *Limax agrestis*) were then placed into the dish. The animals were intentionally placed at the periphery of the dish and given also lettuce as feed supplement. All animals were destroyed seven days after the start of the test.

Instead of using the above mentioned compound the same results were obtained by using the following compounds:

2 - (2 - methylphenyl) - 4 - ethyl - semicarbazide - 1 - carbonic acid-ethyl ester,
2 - (4 - chlorophenyl) - 4 - n - butyl - semicarbazid - 1 - carbonic acid-methyl ester,
1.2-diphenylhydrazine-carbonic acid-butyl ester,
1.2-diphenylhydrazine-carbonic acid-p-chlorophenyl ester,
1-(4-chlorophenyl)-4-n-hexyl-1.2.4-triazolidine-3.5-dion,
1-phenyl-4-amino-1.2.4-triazolidine-3.5-dion.

Example 2

In order to establish whether a molluscicidal substance also has a toxic action by eating, a cage, 50 x 50 x 25 centimeters, made of fly-wire netting was used and filled with an earth layer containing two 1-centimeter-wide strips of bran in the direction and length of the two diagonals.

The bran used contained 2% of active substance of the compound 2-phenyl-4-n-butyl-semicarbazide-1-carbonic acid methyl ester, 1.2-diphenylhydrazine-carbonic acid phenyl ester or 3-methyl-pyrazolone-5 plus 0.25% of a commercial fungicidal agent to prevent mould formation.

In each of the 4 sections subdivided by the bran strips there were placed 4 terrestrial lung snails (*Deroceras agreste* or *Arion hortensis*) which, similar to the animals in the control box, were given the usual feed supplement. One day after the start of the test, the first dead snails were already found. An $LD_{100}$ was already attained on the 4th day after the start of the test.

Even after 10 days of observation no dead animals were found in the control box.

A metaldehyde preparation used for comparison in granular form also consisted of bran as bait material and was placed likewise in diagonal direction grain by grain. Analysis showed a metaldehyde content of 3.6%. An $LD_{100}$ of the snails fed with these metaldehyde-containing bran grains, but otherwise under equal conditions was attained only on the 9th day after beginning of the test.

With a 2% metaldehyde/bran mixture only 7 of the 16 snails used were killed during an observation period of 10 days.

Instead of using the above mentioned compound the same results have been obtained by using the following compounds:

2 - (4 - nitrophenyl) - 4 - n - butyl - semicarbazide - 1 - carbonic acid-n-butyl ester,
2 - (3 - methoxyphenyl) - 4 - n - butyl - semicarbazide-1-carbonic acid-phenyl ester,
1.2 - di - (4 - methoxyphenyl) - hydrazine - carbonic acid-phenyl ester,
1.2 - di - (3 - chlorophenyl) - hydrazine - carbonic acid-cyclohexyl-ester.

Example 3

Young cabbage or lettuce plants were planted in the boxes made of fly-wire netting described above and sprayed with a 2% solution of one of the compounds 2-phenyl-4-n-butyl-semicarbazide-1-carbonic acid methyl ester, 1.2-diphenylhydrazine-carbonic acid phenyl ester or 3-methyl pyrazolone-5. The preparation of a 2% metaldehyde solution is difficult because all available solvents are more or less phytotoxic. A 2% metaldehyde-containing spraying powder was therefore employed. The young plants treated with the compounds according to the invention or with metaldehyde were infested with 20 snails per box. Untreated feed supplement was unnecessary as shown by control tests.

The results were evalued 8 days after the start of the test: young plants sprayed with 2-phenyl-4-n-butyl-semicarbazide-1-carboxylic acid methyl ester, 1.2-diphenyl-hydrazine-carboxylic acid phenyl ester or 3-methyl-pyrazolone-5 resulted in a 100% killing of the snails within this test period. In the box which contained plants sprayed with metaldehyde out of 20 snails 3 were dead, 5 damaged and 12 in good health.

Instead of using the above mentioned compound same results were obtained by using the following compound:

2-phenyl-4-dimethyl-semicarbazide-1-carbonic acid-methyl ester,
2-phenyl-4-dimethyl-semicarbazide-1-carbonic acid-phenyl ester,
1.2-di(3-methylphenyl)-hydrazine-carbonic acid-N.N-dimethyl-amide,
1.2-di-(4-chlorophenyl)-hydrazine-carbonic acid-anilide,
1-(4-nitrophenyl)-4-phenyl-1.2.4-triazolidine-3.5-dion,
1-(3-methoxyphenyl)-4-cyclohexyl-1.2.4-triazolidine-3.5-dion,
3-butyl-pyrazolone-5,
3-cyclohexyl-pyrazolone-5.

We claim:

1. A method of combating snails and slugs which comprises contacting said snails and slugs with an effective amount of a compound of the formula

wherein R is a phenyl radical, $R_1$ is a member selected from the group consisting of a carbonic ester group and an aryl radical; $R_2$ is a member selected from the group consisting of an alkoxyl, aroxyl group, a primary and secondary amino group; and $R_1$ and $R_2$ together form a triazolidine ring.

2. A method of combating snails which comprises exposing said snails to a bait containing an effective amount of a compound of the formula

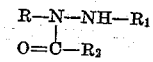

wherein R is a phenyl radical, $R_1$ is a member selected from the group consisting of a carbonic ester group and an aryl radical; $R_2$ is a member selected from the group consisting of an alkoxyl, aroxyl group, a primary and secondary amino group; and $R_1$ and $R_2$ together form a triazolidine ring.

3. A method of combating slugs which comprises exposing said slugs to a bait containing an effective amount of a compound of the formula

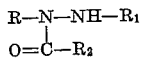

wherein R is a phenyl radical, $R_1$ is a member selected from the group consisting of a carbonic ester group and an aryl radical; $R_2$ is a member selected from the group consisting of an alkoxyl, aroxyl group, a primary and secondary amino group; and $R_1$ and $R_2$ together form a triazolidine ring.

4. A method of combating snails and slugs which comprises contacting said snails and slugs with an effective amount of a compound of the formula

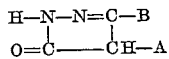

wherein A stands for a member selected from the group consisting of hydrogen, an alkyl group with 1–4 carbon atoms and a phenyl radical, and B stands for a lower alkyl radical up to 4 carbon atoms.

5. A method of combating snails which comprises exposing said snails to a bait containing an effective amount of a compound of the formula

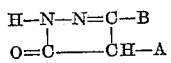

wherein A stands for a member selected from the group consisting of hydrogen, an alkyl group with 1–4 carbon atoms and a phenyl radical, and B stands for a lower alkyl radical up to 4 carbon atoms.

6. A method of combating slugs which comprises exposing said slugs to a bait containing an effective amount of a compound of the formula

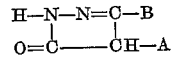

wherein A stands for a member selected from the group consisting of hydrogen, an alkyl group with 1–4 carbon atoms and a phenyl radical, and B stands for a lower alkyl radical up to 4 carbon atoms.

7. Method of combating snails and slugs, which comprises exposing said snails and slugs to a bait containing an effective amount of 1-phenyl-4-n-butyl-semicarbazide-1-carbonic ester.

8. Method of combating snails and slugs, which comprises exposing said snails and slugs to a bait containing an effective amount of 1.2-diphenylhydrazine-carbonic acid phenyl ester.

9. Method of combating snails and slugs, which comprises exposing said snails and slugs to a bait containing an effective amount of 3-methylpyrazolone-5.

No references cited.